SELF-PROPAGATING INTERMITTENT DISCHARGE DELAY LINES

Filed Sept. 16, 1954

INVENTORS: W. S. BOYLE
R. W. KETCHLEDGE
BY H. O. Wright
ATTORNEY

United States Patent Office 2,884,565

Patented Apr. 28, 1959

2,884,565

SELF-PROPAGATING INTERMITTENT DISCHARGE DELAY LINES

Willard S. Boyle, Murray Hill, and Raymond W. Ketchledge, Whippany, N.J., assignors to Bell Telephone Laboratories, Incorporated, New York, N.Y., a corporation of New York Application September 16, 1954, Serial No. 456,571

6 Claims. (Cl. 315—84.5)

Figure 1:
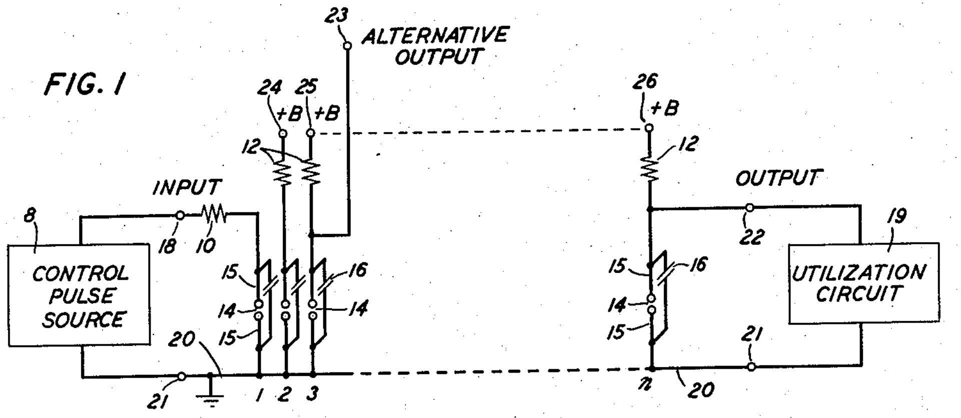

This invention relates to electrical delay circuits. More particularly it relates to electrical delay circuits employing self-propagating intermittent spark discharge trains adapted to provide an output pulse or train of pulses, delayed with respect to an input pulse, by time, or delay, periods which can be accurately controlled within a few millimicroseconds.

In one form, devices of the invention comprise delay lines of the above-indicated capability which can be tapped to provide output pulses delayed by any of a number of delay periods each of which periods can be accurately controlled within a few millimicroseconds.

In another form, devices of the invention comprise "closed-ring" pulsing circuits which respond to a single input pulse to provide any of a number of pulse series, the pulses of each series having a predetermined interpulse time interval which can be accurately controlled within a few millimicroseconds.

In a still further form, devices of the invention comprise combinations including self-propagating intermittent spark discharge devices of the type described and claimed in applicant W. S. Boyle's copending application, entitled "Intermittent Discharge Pulse Generators," Serial No. 444,457, filed July 20, 1954, and assigned to applicant's assignee.

In applicant Boyle's above-mentioned copending application it is taught that the application of a single, short duration, limited, constant-current pulse across a pair of suitably arranged, closely spaced, electrodes associated with a local circuit, said circuit including appropriate inductive and capacitative reactances, a number of discrete spark discharges occurring at regular, closely spaced time intervals and in an ordered spacial array on the cathode, or negative electrode, can be obtained.

The intermittent nature of the discharge, as obtained by the arrangements of applicant Boyle's sole application, is believed to result from the associated local circuit behaving in the manner of a relaxation oscillator. Each spark discharge is in the nature of an explosion and gives rise to a "blast" acoustic wave. The next successive discharge will therefore occur at that point in the "blast" acoustic wave from the previous discharge which best satisfies the conditions for electrical breakdown, the time interval between successive discharges being largely determined by the constants of the associated local circuit. A peculiar feature of these arrangements, as observed in actual demonstrations by applicant Boyle and his associates and reported in his copending sole application mentioned above, is that a voltage of between 600 to 900 volts is required to cause the initial, instantaneous, single spark discharge across a small gap, but successive discharges of the same intermittent train require only a voltage of substantially 300 volts to be established. This feature indicates that the blast or shock wave of the initial and each successive spark discharge in turn establishes a condition more favorable to the occurrence of the next successive spark discharge. Various theories are immediately suggested by these observed phenomena, such as that the more favorable condition results from the heating or the partial ionization, or both, of the gases between the electrodes. The "more favorable condition" has been found to travel from the point of a specific instantaneous spark discharge with a velocity corresponding to that to be expected of a shock or blast acoustic wave, since the next successive spark discharge occurs at a discrete distance, predictable on the basis of the theory suggested, from the position of the immediately preceding spark discharge. The distance between successive discharges along the cathode surface is, in accordance with actual demonstrations as well as with the above theory, determined by the velocity of the blast acoustic wave, so that, with various arrangements of Boyle's sole invention, described in detail in his above-mentioned copending application, a series of spark discharges, evenly spaced in both time and distance can be readily obtained.

As taught in applicant Boyle's above-mentioned sole application, a steady metal arc, as distinguished from the desired intermittent succession of discrete momentary, or instantaneous, spark discharges, will not be established so long as the circuit conforms with the relation;

$$\left[\sqrt{\frac{V_B{}^2}{I^2}\frac{C}{l}+1}\right]e^{-\frac{r}{2}\pi\sqrt{\frac{C}{l}}}<1 \qquad (1)$$

where $V_B$ is the breakdown voltage developed across the gap, I is the current passing through the gap, C is the effective capacity of the local circuit shunting the gap, $l$ is the inductance of the local circuit, $r$ is the resistance of the local circuit, $e$ is the base of naperian logarithms, and $\pi$ is the number of radians per half cycle.

In accordance with the present joint invention a series or succession of self-propagating discrete spark discharges is likewise employed. However, instead of having all the spark discharges occur on a common cathode member and subject to control by a single common associated circuit, one or more additional electrically independent pairs of closely spaced discharge electrodes are provided. In view of the above noted fact that the breakdown voltage across a given gap in the presence of the blast or shock wave has been found to be reduced to approximately half that required if no shock wave is present, it is possible to bias each independent pair of electrodes to a voltage sufficient to cause a spark discharge in the presence of an appropriate shock wave, but no discharge will take place unless and until such a shock wave is caused to impinge upon said electrodes. Obviously, the required bias can conveniently be established by charging a condenser connected in shunt with the gap to the desired voltage and maintaining the charge until an instantaneous spark discharge is caused by an impinging shock wave originating from a spark discharge across a closely adjacent pair of electrodes. Each additional independent pair of electrodes has its own electrically independent associated local circuit with independent biasing means, and the gap between each pair of electrodes is physically positioned in such proximity to the gap between a prior pair of electrodes in the series, that the blast acoustic wave, resulting from a spark discharge across the gap between the prior pair of electrodes, will upon impinging on the gap between the next successive pair of electrodes, result in a spark discharge thereacross. As will become apparent from the detailed description given hereinunder, in order to realize the extreme accuracy in timing, it is necessary that a momentary, or instantaneous, discrete spark discharge, and not a sustained metal arc discharge, take place across each of such independent pairs of electrodes in turn, as the blast acoustic wave from the next preceding pair impinges upon it. This is assured by the design of the circuit. In each instance the gap is directly shunted by a small capacitance, the latter being recharged after discharge through the spark gap, through a resistor of sufficient value that the time constant of the circuit will be long as compared with the duration of the spark discharge.

Chains, or rows, of closely spaced independent pairs of electrodes can therefore function as delay lines, the operation of which can be initiated by an input pulse appropriate to cause a spark discharge across an electrode pair at or near one end of the chain whereupon successive discharges will take place in sequential manner along the chain of electrode pairs and an output pulse can be taken from the associated circuit of any subsequent pair of electrodes, which output pulse will be delayed in time with respect to the input pulse by the time required for the successively occurring spark discharges to travel along the chain from the input to the specific pair of electrodes to which the particular output terminal is connected.

As contrasted with the arrangements disclosed in the above-mentioned copending application of applicant Boyle, in which successive pulses can continue to occur only for the duration of the input pulse, in the arrangements of the present invention the input pulse usually need only suffice to produce the initial spark discharge and thereafter each electrically independent unit will "fire" upon arrival of the blast acoustic wave from the next preceding unit.

Indeed, in a "loop" or "ring type" delay line of the present invention, an illustrative form of which will be disclosed and described in detail hereinunder, successive discharges may take place around the loop or ring for a number of complete cycles in response to a single short input pulse.

A further definite distinction, between structures of the present invention and those of the Boyle application, is that the individual units of structures of the present invention, comprising electrically independent pairs of electrodes each with its own independent associated circuit, can be arranged, as will become apparent in the course of the detailed description given hereinbelow, to be rendered unresponsive to further acoustic shockwave induced breakdown for a discrete determinable interval following each spark discharge occurring in the course of normal operation of the structure.

Certain structures of the present invention are, furthermore, capable of modification and rearrangement to provide highly useful "logic" circuits and the like, illustrative examples of which are disclosed and claimed in the copending sole application of applicant R. W. Ketchledge, Serial No. 456,594, filed on September 16, 1954, concurrently with the present application and having the same assignee. This application matured into Patent 2,729,753 granted January 3, 1956.

A principal object of the present invention is the determination of the time interval between the occurrence of two discrete successive electrical impulses to an accuracy of a few millimicroseconds.

Another object of the invention is to enable the production of an output pulse at a definite predetermined time interval following the application of an input pulse, the interval being controlled to an accuracy of a few millimicroseconds.

A further object is to provide a delay line having a delay determinable to an accuracy of a few millimicroseconds.

A still further object is to provide a cyclically operative pulse delay loop or ring circuit which will circulate a pulse a number of times around said loop or ring circuit in response to a single short duration input pulse.

Other and further objects will become apparent during the course of the description of specific illustrative embodiments of the present invention given hereinunder and from the appended claims.

Figures 2, 3:
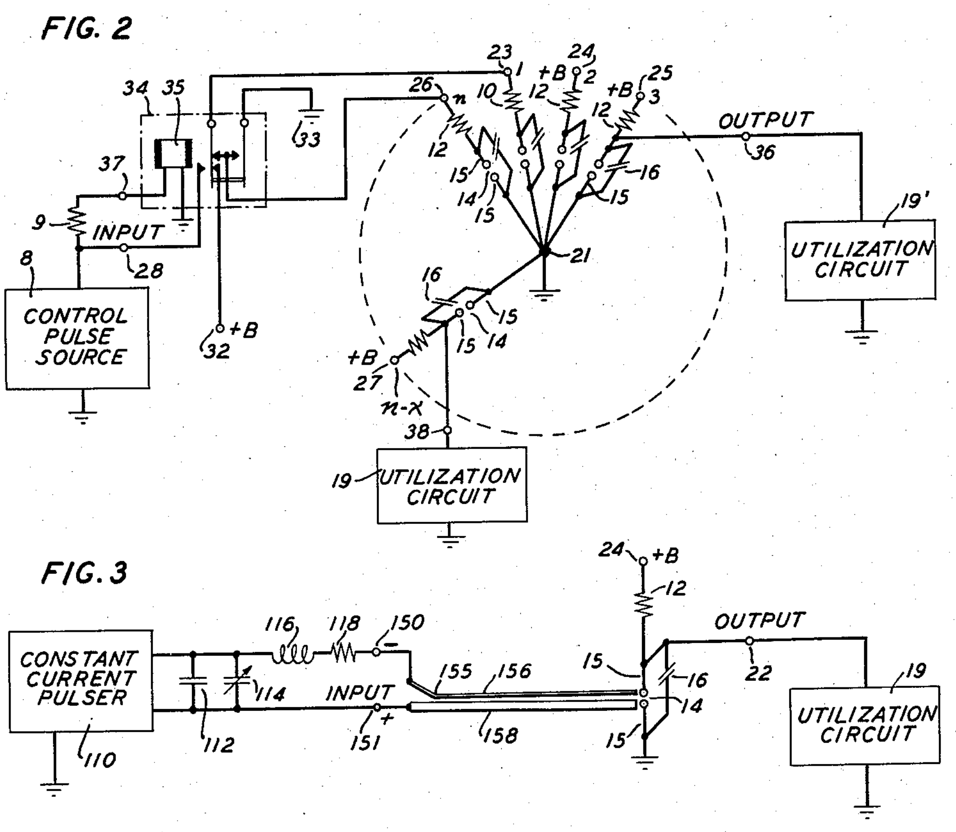

The principles, nature and modus operandi, as well as other features and advantages, of the present invention, will be more readily understood from the following description, taken in conjunction with the accompanying drawings in which:

Fig. 1 represents a simple circuit arrangement of the invention including a row or chain of electrode pairs for producing an output pulse delayed by a predetermined number of millimicroseconds with respect to an input pulse;

Fig. 2 represents a circuit of the general type illustrated in Fig. 1 but with the row or chain of electrode pairs arranged in a circle or ring whereby a series of spark discharges which may continue for several complete cycles around the ring can be initiated by a single input pulse; and Fig. 3 represents a combination of an intermittent discharge pulse generator of applicant Boyle's sole application, mentioned above, with an independently biased pair of electrodes of the present invention, the combination affording a predetermined delay between an input and an output pulse with an accuracy of a few millimicroseconds.

In more detail in Fig. 1 a plurality of "*n*" (where "*n*" can be any integral number) pairs of spark discharge electrodes 15 numbered, 1, 2, 3, . . . *n*, respectively, are arranged in a row to form a like plurality of small spark gaps 14. Each gap 14 is shunted by a capacitor 16. One electrode 15 of each pair (the lower electrode 15) is connected to ground conductor 20, as shown, and the other (or upper) electrode of all but the extreme left pair, is connected through a resistor 12 to the positive terminal of an independent source of potential designated +B, the negative terminals of all said independent potential sources being grounded. In practice it is usually more convenient to employ a single common source for the voltage +B and to include an isolating impedance, which can, for example, be a resistor having a resistance in the order of 100 ohms between each terminal and the source +B. By coincidence, as stated hereinbelow, a convenient value of resistor 12 is 100 ohms so that resistor 12 will in each instance inherently perform the second function of isolating its associated gap and condenser from coupling to other gaps through a common source of voltage +B, if such a common source is in fact employed. The upper electrode 15 of the extreme left pair (first pair) is connected through resistor 10 to input terminal 18. A control pulse source 8 is connected between input terminal 18 and ground terminal 21 as shown. The upper electrode 15 of the extreme right (or *n*th) pair of electrodes is connected to output terminal 22. A utilization circuit 19 is connected between terminal 22 and ground terminal 21 as shown. Alternative output terminals can be connected to any of the upper electrodes 15 of the successive pairs, one such terminal 23 being shown as connected to the third upper electrode. Obviously, the nearer the output terminal is to the left end of the array (the input end) the shorter will be the delay between the input and the output pulses. Another obvious alternative is to cause the initial spark discharge to take place at a gap intermediate the ends of the row and to derive output pulses from both ends of the row, the relative time intervals between the input pulse and the output pulse at each end being, of course, dependent upon the distance of that end from the spark gap at which the initial discharge was caused.

The application of a positive pulse from source 8 to terminals 18, 21, of Fig. 1 of sufficient amplitude to cause a discrete momentary spark discharge across the extreme left gap 14 (No. 1) will then result, as taught in the above-mentioned sole application of applicant Boyle, in the generation of a "blast" acoustic wave. Successive gaps toward the right are maintained at a voltage near their breakdown values by the charging of their associated capacitors 16 by the above-mentioned independent potential sources +B so that as the proper portion of the blast acoustic wave from gap No. 1 impinges upon gap No. 2, the latter in turn breaks down discharging its associated shunting condenser 16 and initiating its own blast acoustic wave. As taught in applicant Boyle's above-mentioned copending application, and described in detail above, it has been found that the voltage required to cause a spark discharge across a short gap will be between 600 to 900 volts if the air between the gap is substantially undisturbed. However, if an acoustic shock or blast wave created by a spark discharge in the immediate vicinity of the gap is impinging upon the gap, a voltage of substantially 300 volts will suffice to cause a spark discharge across the gap. Accordingly, it is apparent that a condenser such as condenser 16 can, in such a case, be shunted across the gap and be charged to maintain a voltage somewhat in excess of 300 volts but appreciably less than 600 volts across the gap and no spark discharge will take place until an appropriate acoustic shock or blast wave is caused to impinge upon the gap. It is further obvious that upon discharge of the condenser by a spark discharge across the gap a time interval will be required to recharge the condenser from its +B supply through resistor 12 to the desired voltage, the length of the interval being determined by the time constant of the circuit, which time constant can obviously be increased or decreased by respectively increasing or decreasing the resistance of resistor 12 or the capacity of condenser 16. During the recharging interval and before the desired priming voltage is reestablished across condenser 16, no spark discharge will take place even if an appropriate shock or blast wave impinges upon the gap. In other words, the particular gap is not primed for firing until the recharging has been effected and no spark discharge across it can be induced by a shock wave while it is thus disabled. The process of successive discharge of the gaps continues from left to right until a spark discharge occurs across the extreme right or *n*th spark gap at which time an output pulse will appear at terminal 22 which will obviously be delayed with respect to the above-mentioned input pulse by the time required for all the gaps to break down in successive order, as just described. As mentioned hereinabove, it is necessary in order to realize the extreme accuracy in timing desired that each spark discharge be a discrete momentary, or instantaneous discharge. As is well known to those skilled in the art, the discharge of a small capacitor through a small gap directly shunted across the capacitor is essentially a discrete momentary, or instantaneous discharge.

It should be noted, as explained in detail above, that as each gap breaks down its associated condenser is discharged and therefore any particular intermediate gap in the chain will not be in condition to respond, following a spark discharge across it, to a further blast acoustic wave until its associated condenser has been recharged by current from its associated potential source +B, reaching it through its associated resistor 12. By adjusting the values of resistors 12 and capacitors 16 the interval following a spark discharge, before the capacitor 16 will become fully recharged, placing its associated electrodes in condition for a second discharge, can be readily adjusted. Furthermore, by employing alternative outputs such as 23 a plurality of output pulses may be obtained from a single input pulse, the plurality of output pulses occurring in succession at time intervals determinable with an accuracy of a few millimicroseconds.

In Fig. 2 an arrangement similar in the majority of its details to that of Fig. 1 is shown. The arrangement of Fig. 2 differs from that of Fig. 1 in that the *n* successively spaced pairs of electrodes 15 are arranged in a ring or circle, as shown, the inner electrode of each pair being connected to a common ground terminal 21.

A relay 34, or an equivalent switching device, having an operating winding 35, is arranged to initiate the chain of successive spark discharges which, for example, can conveniently proceed in a clockwise direction around the ring. As a first function, relay 34 connects terminal 23 of the No. 1 pair of discharge electrodes to input terminal 28, to which terminal a control pulse source of voltage 8 is connected, the pulses therefrom being of sufficient magnitude to cause a spark discharge across the No. 1 pair of electrodes. This source can be readily arranged to also operate relay 34 through resistor 9 and terminal 37 to ground, as shown.

As a precaution against initiating, simultaneously, a chain of spark discharges proceeding in a counterclockwise direction around the ring the relay 34 is also equipped with contacts which, simultaneously with the connection of terminal 23 to terminal 28, disconnect terminals 26 and 23 from the +B source at terminal 32 and connect terminal 26 to ground 33 thus discharging the condenser 16 associated with the *n*th pair of electrodes sufficiently to prevent the acoustic wave, traveling toward the left from the discharge across the No. 1 electrodes, from causing a discharge across the *n*th electrodes. Shortly after the spark discharge across electrodes No. 1 has occurred, relay 34 restores to the position shown in Fig. 2 and current from the +B source at terminal 32 recharges the capacitors 16 associated with the No. 1 and *n*th pairs of electrodes. Meanwhile, the other electrodes Nos. 2, 3, . . . , $n-x$, . . . , $n$ break down in succession in a clockwise direction around the ring and the acoustic wave from the discharge across the *n*th pair of electrodes causes, in due order, a second discharge across the No. 1 electrodes, the process continuing for several complete cycles. Thus from any outer electrode of a pair of electrodes 15, a terminal such as 36, or 38, can be connected and a series of pulses taken, therefrom to utilization circuits 19' or 19, respectively, as indicated. The initial pulse of each series from a particular output terminal will be delayed a predetermined time interval with respect to the starting pulse, depending upon the time delay required for the successive discharges of prior electrode pairs to reach the particular electrode, and further pulses of each series will be delayed by the time required for a complete cycle of successive discharges to travel around the ring. The arrangement shown in Fig. 2 is, therefore, capable of providing a plurality of series of pulses the pulses of each series occurring at intervals determined by the time required for a complete cycle of discharges around the ring. Each pulse of any particular series will, of course, occur at a definite time interval with respect to the corresponding pulse of any other series, the interval being determined by the relative points of connection to the ring for the respective terminals from which the series of pulses are obtained. Such devices are, obviously, of value for furnishing timing pulses or repetitively occurring groups of code pulse combinations and the like, as may be required in numerous varieties and types of timing and intelligence transmission systems. It is, of course, not necessary that a circular arrangement of the electrode chain be employed, as any closed loop of electrodes would obviously operate in the same manner.

In general the gaps between the electrodes of the pairs of electrodes 15 will depend on the type and pressure of the gas surrounding the electrodes. In air at atmospheric pressure this distance will be quite small, for example, in the order of three mils and the distance between successive gaps should be in the order of from 10 to 20 mils. For the above gap size, in air at atmospheric pressure, a biasing voltage +B of approximately 300 volts should be used. Usually a "recovery time" of one microsecond for recharging the associated condenser 16 of each electrode pair will be found satisfactory, in which case condenser 16 may have a capacity in the order of 10,000 micro-microfarads and resistor 12 may have a resistance of approximately 100 ohms. With the above-indicated parameters each spark discharge will be delayed with respect to the last succeeding spark discharge by a time interval of from 100 to 200 millimicroseconds for the limits of the above-suggested spacing range between gaps of 10 to 20 mils, respectively. This unit delay represents the time required for the blast acoustic wave to travel from one gap to the next successive gap. If the gap spacing is uniform the unit time need only be multiplied by the number of intervals between gaps to obtain the delay of the assembly between the input and output pulses.

In some instances, particularly with the smaller intergap spacings, difficulty may arise from interference, at a particular subsequent gap in the row or chain, between acoustic waves from two or more preceding gaps in the chain. Such difficulties, if encountered, are readily remedied by interposing, between successive gaps, acoustic shielding members having apertures proportioned to pass sufficient acoustic wave energy to the next successive gap to cause it to "fire" but reducing the acoustic wave energy sufficiently to prevent it from "overreaching" to cause interference at the second succeeding or subsequent gaps in the row or loop of gaps. Such an arrangement is illustrated in Fig. 1 of the above-mentioned patent of applicant R. W. Ketchledge, elements 28 being the acoustic shielding members.

Also it is obvious that a row or loop of gaps may be enclosed in an acoustic-energy guide or tube to augment the transmission of the acoustic wave energy from each gap to the next successive gap and to confine the acoustic wave energy within said guide or tube. An arrangement of this type is illustrated in Fig. 2 of the above-mentioned patent of applicant R. W. Ketchledge.

In Fig. 3, one combination comprising a device of the type described in detail in applicant Boyle's above-mentioned sole application with an output arrangement of the present invention is illustrated. As taught in Boyle's sole application, if a constant current pulse of appropriate magnitude from pulser 110 is applied to terminals 150, 151 a spark discharge will occur at point 155 and will be followed by successive intermittent spark discharges, each discharge occurring at a time interval determined principally by the circuit parameters represented by resistor 118, inductor 116, and capacitors 114, 112. Each successive spark discharge will be spaced to the right of its preceding spark discharge along the electrodes 156, 158 by a distance determined principally by the velocity of the acoustic shock wave generated by the preceding spark discharge. If constant current pulser 110 provides a pulse of sufficient duration that the intermittent spark discharges continue to occur until a discharge takes place at or near the extreme right ends of electrodes 156, 158, then a spark discharge will be induced across gap 14 between electrodes 15 and an output pulse will occur at terminal 22. The time delay between the instant a pulse from pulser 110 causes a discharge at point 155 and the instant an output pulse occurs at terminal 22 is obviously determined by the time required for the intermittent succession of spark discharges to travel from point 155 to the right ends of electrodes 156, 158 and for the spark discharge to occur between electrodes 15. Thus the combination of Fig. 3 is a delay line. Furthermore, the occurrence of an output pulse at terminal 22 is an indication that the length of the pulse applied to terminals 150, 151 was at least as long as the interval required for the intermittent pulse discharges to travel the length of the electrodes, 156, 158. The combination of Fig. 3 is therefore a minimum pulse length indicator, i.e., a device which will respond only if a pulse of at least a predetermined minimum length is applied to terminals 150, 151. This is immediately apparent since as taught in applicant Boyle's above-mentioned application and explained in detail above, the first spark discharge will occur at point 155 of Fig. 3 and successive sparks will occur at equal intervals progressively further to the right of point 155. As is also taught in applicant Boyle's above-mentioned application, the succession of spark discharges equally spaced along electrodes 156, 158 is immediately terminated by termination of the pulse from the pulser 10. Obviously, if the pulse provided does not continue for a period sufficient for the successive spark discharges to "step off" the entire length of the electrodes 156, 158, no spark discharge will take place at the right ends of said electrodes and gap 14 will therefore not be fired.

As described in applicant Boyle's copending application, capacitor 112, inductor 116, and resistor 118 can, in general, be the distributed constants of the circuit interconnecting pulser 110 and terminals 150, 151. Capacitor 114 is a discrete adjustable capacitor by means of which the time constant of the over-all circuit just mentioned can be varied within a substantial range of values as taught in said sole application. The terminal circuit including resistor 12, capacitor 16, and electrodes 15 having a gap 14 therebetween, is of course identical with the corresponding units of the circuit of Fig. 1 described in detail above.

Obviously a chain of electrodes with associated circuits as shown in Fig. 1 or Fig. 2 can be associated with the circuit shown to the left of the just described terminal circuit of Fig. 3, in numerous and varied ways, for objects and purposes which should be obvious in view of the descriptions given hereinabove.

In general, numerous and varied applications and arrangements in accordance with the principles and within the spirit and scope of the invention as disclosed in this application can readily be devised by those skilled in the art.

What is claimed is:

1. In combination a plurality of pairs of spark discharge electrodes each pair of electrodes having a small gap therebetween, said pairs of electrodes being positioned in a row at short intervals between successive gaps of said pairs, a first means including a source of positive pulses for causing a discrete momentary spark discharge to occur across a first gap in said row, and a second means independent of said first means, for biasing each successive gap in said row to a voltage slightly below its required breakdown voltage the circuit associated with each of said pair of electrodes comprising a small capacitor connected directly in shunt with said pair of electrodes and a direct current source connected through a resistor to recharge said capacitor following the discharge thereof through said gap, the time constant of said recharging circuit being large with respect to the duration of the spark discharge across said electrodes, whereby each gap will break down in succession causing a discrete momentary spark discharge and generating an acoustic shock wave which upon reaching the next biased gap in said row will cause a discrete momentary spark discharge at said gap and terminal means connected to at least one of said biased pair of electrodes at which a discrete momentary output pulse will be obtained when a discrete momentary spark discharge occurs across the gap between said electrode pair.

2. The combination of claim 1 in which said row of electrode pairs are positioned on a closed loop whereby a succession of discrete momentary spark discharges once initiated will make several cycles around said loop.

3. The combination of claim 2 and a plurality of terminals connected to a like plurality of electrode pairs spaced throughout said loop of electrode pairs whereby a like plurality of series of discrete momentary pulses can be obtained, the time interval between successive pulses of each series being determined by the cycle time of said loop, the time interval between corresponding pulses of each series being determined by the relative positions of the respective terminals around said loop.

4. In combination a self-propagating intermittent spark discharge device comprising a first pair of substantially parallel elongated electrodes, a constant current pulser and a circuit interconnecting said pulser and one end of said elongated electrodes, said circuit including in shunt relation to said electrodes, resistive, inductive and capacitative impedances, a loop circuit consisting of a capacitor in series with a second pair of closely spaced spark discharge electrodes, said second pair of electrodes being positioned with said small gap closely adjacent the other end of said first pair of electrodes, means for maintaining a biasing voltage across the gap of said second pair of electrodes said biasing voltage being slightly less than the breakdown voltage across said gap and an output circuit connected to said second pair of electrodes, the circuit associated with said first pair of electrodes conforming to the relation;

$$\left[\sqrt{\frac{V_B^2}{I_2}\frac{C}{l}+1}\right]e^{-\frac{r}{2}\pi\sqrt{\frac{C}{l}}}<1 \qquad (1)$$

where $V_B$ is the breakdown voltage developed across the gap, I is the current passing through the gap, C is the effective capacity of the local circuit shunting the gap, $l$ is the inductance of the local circuit, $r$ is the resistance of the local circuit, $e$ is the base of naperian logarithms, and $\pi$ is the number of radians per half cycle, the constant current pulser providing a constant current pulse of duration sufficient to sustain a series of intermittent spark discharges along the entire length of said first pair of electrodes.

5. In combination a plurality of spark discharge devices each shunted by a small discharge capacitor, said capacitor providing means for limiting the discharge of said devices to momentary spark discharges, means for biasing all but one of said devices through said capacitors to a voltage just below their respective breakdown voltages, said devices being closely spaced in consecutive order at distances determined by the velocity of a shock wave produced by the momentary spark discharge of one of said devices and the time desired for the shock wave to reach the adjacent device and excite the momentary spark discharge thereof, means for exciting the initial spark discharge of the unbiased device to initiate a self-propagating series of consecutive momentary spark discharges, and means for utilizing the output of at least one of said biased devices.

6. The device of claim 5 and means associated with a spark discharge device thereof for disabling said spark discharge device following each spark discharge across it for a predetermined interval of time.

References Cited in the file of this patent

UNITED STATES PATENTS

| | | |
|---|---|---|
| 1,898,626 | Healy | Feb. 21, 1933 |
| 2,240,788 | Kock | May 6, 1941 |
| 2,607,015 | Townsend | Aug. 12, 1952 |